United States Patent
Yu et al.

(10) Patent No.: US 11,082,827 B2
(45) Date of Patent: Aug. 3, 2021

(54) HANDOVER IN LTE-A-HETEROGENEOUS NETWORK

(71) Applicant: Nokia Solutions and Networks Oy, Espoo (FI)

(72) Inventors: Ling Yu, Kauniainen (FI); Vinh Van Phan, Oulu (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 695 days.

(21) Appl. No.: 15/506,662

(22) PCT Filed: Dec. 5, 2014

(86) PCT No.: PCT/EP2014/076680
§ 371 (c)(1),
(2) Date: Feb. 24, 2017

(87) PCT Pub. No.: WO2016/029976
PCT Pub. Date: Mar. 3, 2016

(65) Prior Publication Data
US 2017/0257907 A1  Sep. 7, 2017

(30) Foreign Application Priority Data
Aug. 26, 2014  (WO) .................. PCT/EP2014/068055

(51) Int. Cl.
*H04W 8/00* (2009.01)
*H04W 76/40* (2018.01)
(Continued)

(52) U.S. Cl.
CPC ....... *H04W 8/005* (2013.01); *H04W 36/0022* (2013.01); *H04W 36/0033* (2013.01);
(Continued)

(58) Field of Classification Search
CPC ..... H04W 8/005; H04W 76/14; H04W 76/40; H04W 38/00837; H04W 36/0085;
(Continued)

(56) References Cited

U.S. PATENT DOCUMENTS

| 2011/0319013 A1* | 12/2011 | Jung | .................... H04B 7/2606 455/7 |
| 2013/0034081 A1* | 2/2013 | Ban | ........................ H04W 36/16 370/331 |

(Continued)

FOREIGN PATENT DOCUMENTS

EP  2384054 A1  11/2011

OTHER PUBLICATIONS

International Search Report and Written Opinion received for corresponding Patent Cooperation Treaty Application No. PCT/EP2014/076680, dated Apr. 14, 2015, 14 pages.

(Continued)

*Primary Examiner* — Charles N Appiah
*Assistant Examiner* — Frank E Donado
(74) *Attorney, Agent, or Firm* — Brake Hughes Bellermann LLP

(57) ABSTRACT

There is provided a method, comprising: configuring, by a network node controlling a macro cell of a cellular communication system, at least one handover trigger related signalling configuration for at least one terminal device of the cellular communication system; receiving, by the network node controlling the macro cell, as a result of said signalling configuration, an uplink message broadcasted by the at least one terminal device via a local area access node; recognizing the local area access node as an edge node located at an edge of a coverage area of the macro cell; and initiating a handover of the terminal device between the macro cell and a neighbouring macro cell.

20 Claims, 9 Drawing Sheets

(51) Int. Cl.
  *H04W 76/14*   (2018.01)
  *H04W 36/00*   (2009.01)
  *H04W 36/02*   (2009.01)
  *H04W 48/16*   (2009.01)
  *H04W 72/00*   (2009.01)
  *H04W 36/24*   (2009.01)
  *H04W 84/04*   (2009.01)

(52) U.S. Cl.
  CPC ... *H04W 36/0072* (2013.01); *H04W 36/0083* (2013.01); *H04W 36/0085* (2018.08); *H04W 36/00837* (2018.08); *H04W 36/026* (2013.01); *H04W 36/24* (2013.01); *H04W 48/16* (2013.01); *H04W 72/005* (2013.01); *H04W 76/14* (2018.02); *H04W 76/40* (2018.02); *H04W 84/04* (2013.01)

(58) Field of Classification Search
  CPC ......... H04W 36/0022; H04W 36/0033; H04W 36/0072; H04W 36/0083; H04W 36/026; H04W 36/24; H04W 48/16; H04W 72/005; H04W 84/04
  USPC ........................................ 455/439
  See application file for complete search history.

(56) References Cited

U.S. PATENT DOCUMENTS

| | | | |
|---|---|---|---|
| 2014/0204771 A1 | 7/2014 | Gao et al. | |
| 2014/0328309 A1* | 11/2014 | Comstock | H04W 72/082 370/329 |
| 2015/0045038 A1* | 2/2015 | Gao | H04W 36/22 455/438 |
| 2015/0189523 A1* | 7/2015 | Michel | H04W 24/10 370/252 |
| 2015/0358865 A1* | 12/2015 | Fu | H04W 36/0058 455/436 |

OTHER PUBLICATIONS

Kyocera: "Handover enhancements with dual connectivity", 3GPP Draft, R2-140698_DC_HO, 3rd Generation Partnership Project, vol. RAN WG2, No. Prague, Czech Republic; Feb. 10, 2014-Feb. 14, 2014, Feb. 9, 2014, XP050791998.

NEC Corporation: "RRC messages over X2 for DC" 3GPP Draft; R2-140619_RRC Message Over X2, 3rd Generation Partnership Project, vol. RAN WG2, No. Prague, Czech Republic; Feb. 10, 2014-Feb. 14, 2014, Feb. 9, 2014, XP050791932.

Nsn et al: "MeNB handover procedure" 3GPP Draft; R3-140613 MENB Handover Procedure 3GPP, vol. RAN WG3 No. San Jose del Cabo, Mexico; Mar. 11, 2014-Apr. 4, 2014 Mar. 30, 2014 XP050795307.

International Search Report and Written Opinion received for corresponding Patent Cooperation Treaty Application No. PCT/EP2014/068055, dated Apr. 29, 2015, 14 pages.

Asadi, et al.: "Dronee: Dual-radio Opportunistic networking for energy efficiency", Computer Communications, vol. 50, Feb. 28, 2014, pp. 41-52, XP028879419, ISSN: 0140-3664.

Intel Corporation: "On medium access control for D2D broadcast transmission", 3GPP Draft; R2-133514, 3rd Generaltion Partnership Project (3GPP), vol. RAN WG2, No. Ljubljana, Slovenia; Oct. 7, 2013-Oct. 11, 2013, Sep. 28, 2013, XP050719228.

"3rd Generation Partnership Project; Technical Specification Group Radio Access Network; Study on LTE Device to Device Proximity Services; Radio Aspects (Release 12)", 3GPP Standard; 3GPP TR 36.843, 3rd Generation Partnership Project, vol. RAN WG1 No. V12.0.1, Mar. 27, 2014, pp. 1-50, XP50770026.

"3rd Generation Partnership Project; Technical Specification Group Services and Systems Aspects; Proximity-based services (ProSe); Stage 2 (Release 12)", 3GPP Standard; 3GPP TS 23.303, vol. SA WG2, No. V12.1.0, Jun. 20, 2014, pp. 1-60 XP050774112.

Office Action for European Application No. 14815601.1, dated Jun. 26, 2020, 7 pages.

* cited by examiner

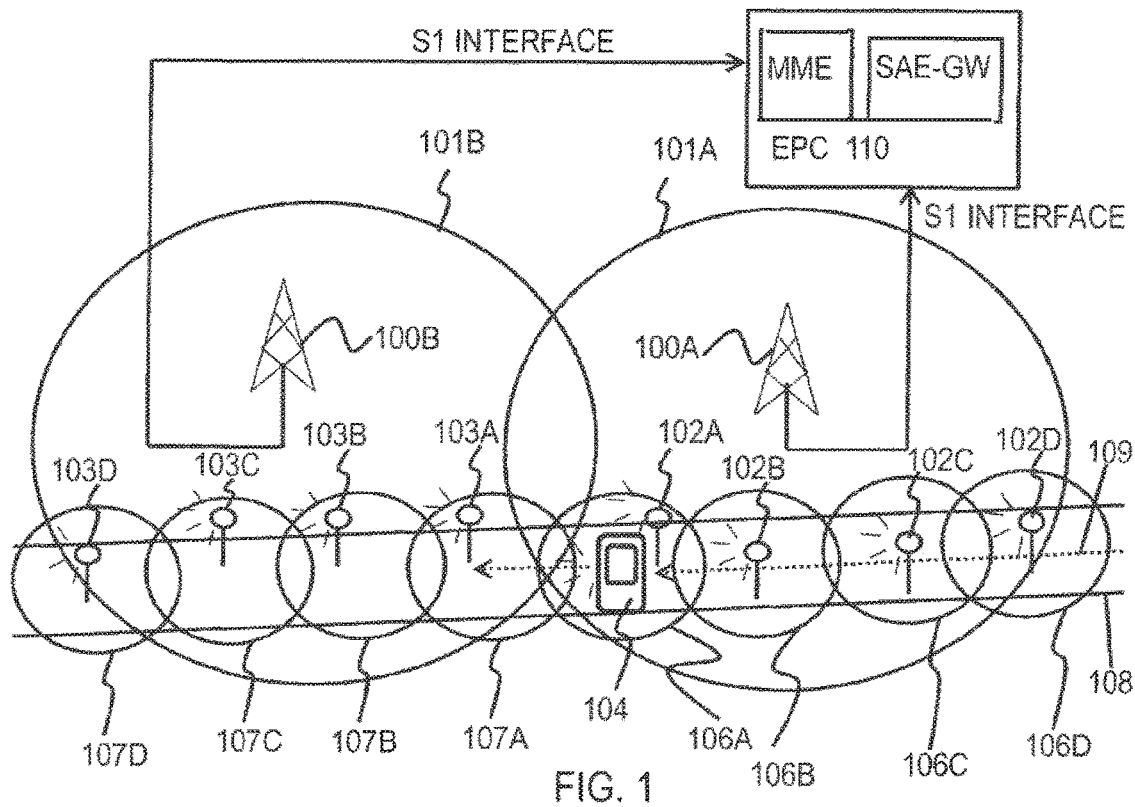

FIG. 1

200 DETECTING BROADCAST TRANSMISSION OF UPLINK DATA FROM TERMINAL DEVICE, WHEREIN TD AND AN HAVE NOT ESTABLISHED MUTUAL RADIO COMMUNICATION CONNECTION WITH EACH OTHER

202 DETECTING INDICATION OF TARGET NETWORK ELEMENT FROM BROADCAST TRANSMISSION

204 CONTROLLING FORWARDING AT LEAST PART OF BROADCAST TRANSMISSION TO TARGET NETWORK ELEMENT AS DEDICATED TRANSMISSION, THEREBY PROVIDING BNA FOR THE TD

FIG. 2

300 ACTIVATING BNA MODE, WHEREIN TD AND THE LA AN HAVE NOT ESTABLISHED COMMUNICATIONS CONNECTIONS WITH EACH OTHER

302 CONTROLLING BROADCAST TRANSMISSION OF UL DATA, WHEREIN BROADCAST TRANSMISSION INCLUDES INDICATION OF LARGE AREA BASE STATION, TO WHICH TERMINAL DEVICE IS CONNECTED TO

304 CONTROLLING RECEPTION OF BROADCASTED DL DATA FROM LA AN

FIG. 3

400 OBTAINING AT LEAST ONE HO TRIGGER RELATED SIGNALLING CONFIGURATION FOR TD TO TRIGGER AT LEAST ONE UPLINK BROADCAST TRANSMISSION WHEN TD IS IN COVERAGE AREA OF LOCAL AREA ACCESS NODE OPERATING EDGE OF COVERAGE AREA OF MACRO CELL NETWORK NODE

402 CAUSING UPLINK BROADCAST TRANSMISSION FROM TD TO NETWORK NODE VIA LOCAL AREA AN ACCORDING TO HO TRIGGER RELATED SIGNALLING CONFIG.

FIG. 4

500 CONFIGURING AT LEAST ONE HO TRIGGER RELATED SIGNALLING CONFIGURAT. FOR AT LEAST ONE TD OF CELLULAR COMMUNICATION SYSTEM

502 RECEIVING AS RESULT OF SAID SIGNALLING CONFIGURATION UPLINK MESSAGE BROADCASTED BY AT LEAST ONE TD VIA LOCAL AREA ACCESS NODE

504 RECONIZING LOCAL AREA ACCESS NODE AS AN EDGE NODE LOCATED AT EDGE OF COVERAGE AREA OF MACRO CELL

506 INITIATING HANDOVER OF TD BETWEEN MACRO CELL AND NEIGHBOURING MACRO CELL

FIG. 5 ns
HANDOVER IN LTE-A-HETEROGENEOUS NETWORK

RELATED APPLICATION

This application was originally filed as Patent Cooperation Treaty Application No. PCT/EP2014/076680 filed Dec. 5, 2014 which claims priority benefit to PCT Patent Application No. PCT/EP2014/068055, filed Aug. 26, 2014.

FIELD OF THE INVENTION

The invention relates to macro cell handover.

BACKGROUND

A heterogeneous network (HetNet) may have small cells deployed under control of macro cells to provide increased capacity to the macro cells. A terminal device connected to a macro cell via a small cell can cause significant signalling overhead particularly in a handover of the terminal to a new macro cell.

BRIEF DESCRIPTION OF THE INVENTION
According to an aspect, there is provided the subject matter of the independent claims.
Embodiments are defined in the dependent claims.

One or more examples of implementations are set forth in more detail in the accompanying drawings and the description below. Other features will be apparent from the description and drawings, and from the claims.

LIST OF THE DRAWINGS

In the following, some aspects of the invention will be described in greater detail with reference to embodiments and the accompanying drawings, in which FIG. 1 presents a network, according to an embodiment;

FIGS. 2 and 3 illustrate an example of a method to activate broadcast based network access;

FIGS. 4 to 6 show flow charts according to some embodiments;

DESCRIPTION OF EMBODIMENTS

Figure 6:
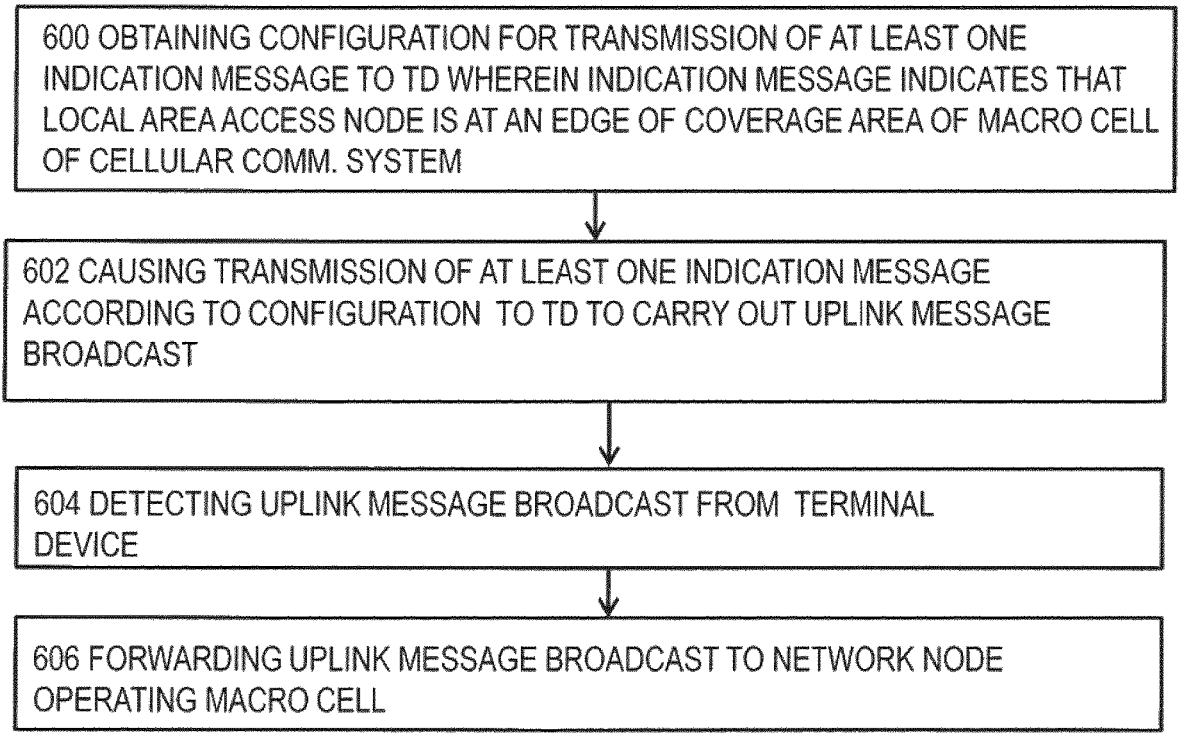

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced (LTE-A), 5G system, and/or systems beyond 5G.

FIG. 1 illustrates a non-limiting example of a wireless communications scenario to which embodiments of the invention may be applied. This example is based on a LTE-Advanced system. As shown in FIG. 1 local area (LA) access nodes (AN) 102A-102D, 103A-103D are located in local area cells (LAC) 106A-106D, 107A-107D. There is a road 108 which is covered by LACs 106A-106D, 107A-107D. A terminal device (TD) moves along the road 108 as shown with a dotted arrow 109. LACs 106A-106D are disposed within the coverage area 101A of a macro cell network node (eNB) 100A and LACs 107A-107D are disposed within the coverage area 101B of a macro cell network node (eNB) 100B.

The eNBs 100A-100B and the ANs 102A-102D, 103A-103D may be connected to and controlled by an Evolved Packet Core (EPC) 110 (MME, S-GW) of the network provider. They may also be connected to different network provides. The connection between the eNBs 100A-100B and the EPC 110 may be accomplished via the S1 interface. The eNBs 100A-100B and the ANs 102A-102D, 103A-103D may be connected to each other via a wired connection or via a wireless connection.

The embodiments are not, however, restricted to the system given as an example but a person skilled in the art may apply the solution to other communication systems provided with necessary properties. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

A device-to-device (D2D) broadcast based network access mode, referred to as D2D BNA or simply as BNA is proposed. D2D BNA mode provides network access services utilizing D2D broadcast based communication between user devices (terminal devices) and small cell access points (APs) under the coordination of a macro cell layer. Thus the serving macro eNB may configure and control user devices and deployed small cells to use the D2D BNA mode to transmit and receive for applications or bearer services of the user devices (such as terminal device, TD 104).. The D2D BNA mode is disclosed in further detail in PCT/EP2014/068055 which is taken herein as a reference with regard to the D2D BNA mode.

It should be appreciated that D2D concept may also cover machine-to-machine (M2M) or machine-type communications. In D2D, connections may be established directly among terminal devices. D2D broadcasting may be based on one or more broadcast transmissions in which D2D devices do not need to setup direct connections before the actual communication starts. A transmitting TD may transmit a scheduling assignment (SA) in which radio resources for data transmission is indicated. Based on detected SA, a receiving TD receives data and check, whether it is targeted to the receiving TD. This detection may be based on a target identifier (ID), which may be given at least partly in the SA and/or at least partly in a data unit. As such, the D2D may, in general, utilise broadcasting, multicasting or unicasting, depending on what kind of a target ID (e.g. a broadcast ID, a group ID, or a UE ID) is used.

In this example, the eNBs 100A-100B may be responsible for controlling a direct communication link between devices. This may include radio resource allocation, permissions to start applying D2D communication, etc. The direct communication link may operate on a same frequency band as a conventional cellular communication link and/or outside that frequency band to provide flexibility. By the term "conventional cellular communication link", it is meant that the UE 104 transmits data via the eNB 100A.

In an embodiment, a heterogeneous network (HetNet) environment may be applied. In HetNet, a radio access network consists of different network layers, e.g. local area network layer generated by the ANs 102A-102D, 103A-103D providing coverage to small cells and deployed under a macro cell coverage umbrella provided by the macro cell eNBs 100A-100B. In an embodiment, it may further be assumed that all ANs, at least within a certain area, are synchronized with each other in order that D2D communication within that area may be based on same synchronization timing.

FIG. 2 depicts an example of a method for enabling D2D BNA mode communications. The method may be carried out by a local area access node, such as the AN 102A. From the point of view of the TD 104, the proposal may include tasks or operations as shown in FIG. 3. In the following, the method is explained by using the exemplifying wireless communications scenario of FIG. 1. The scenario is used for the sake of clarity and it should not be taken as limiting the implementation of the method by any means.

In block 300 of FIG. 3, the TD 104 may activate a BNA, according to which the terminal device 104 accesses the network 110 via broadcast transmissions between the terminal device 104 and at least one local area access node 102A-102D, 103A-103D without the terminal device 104 and the at least one local area access node 102A-102D, 103A-103D first establishing mutual radio communications connections with each other.

In block 302, the TD 104 may then perform a broadcast transmission of uplink data (UL) towards the at least one AN 102A-102D. The TD 104 may include, in the broadcast transmission, an indication of a large area base station to which the user device is connected to, as a target network element of the broadcast transmission. The TD 104 is in an RRC-connected mode with respect to the macro cell network node 100A. Thus, a macro cell identifier (ID) may be included by the TD 104 as a target indication of the broadcast transmission towards the small cell ANs 102A-102D. The target indication may be the ID of the eNB 100A. The target indication may be implicit. E.g. the target indication may be derived from a radio bearer ID together with the TD ID (as a source ID in broadcast transmission). In one embodiment, different eNBs allocate different resource pools for the broadcast transmissions. In such case, the target indication may be derived from a resource pool in which the current broadcast transmission is received.

Consequently, in block 200 of FIG. 2, the AN 102A may detect the broadcast transmission from the TD 104. A bi-directional communication between the local area access nodes 102A-102D and the TD 104 may be based on D2D broadcasting. Such broadcasting is a connectionless transmission, i.e. the TD 104 and the AP 102A have not established a mutual radio communications connection with each other before the broadcast transmission. Thus, there is no need of a time and resource consuming connection setup. The transmission is not dedicated transmission, such as unicasting, or multicasting, but wireless broadcasting which is detectable by any radio element in the coverage area of the broadcast transmission. The broadcast transmission is marked with four short lines next to the TD 104 in FIG. 1.

The broadcast transmission may be omni-directional or directed to a certain sector, such as to a sector where the ANs 102A-102D are located (in case the TD 104 is performing the broadcast transmission) or to a sector where the TD 104 is located (in case the one of the 102A-102D is performing the broadcast transmission).

In block 202, the AN 102A may detect an indication of the target network node 100A (eNB) from the broadcast transmission. The target network node is the eNB 100A with which the UE 104 established RRC connection. In block 204, the small cells ANs 102A-102D may forward at least part of the UL data of the broadcast transmission to the target network element 100A as a dedicated transmission, thereby providing a broadcast based network access for the TD 104. That is, upon receiving UL packets targeted to the macro cell enB 100A, the AN 102A may forward these packets to the macro cell eNB 100A. It may be noted that the ANs 102A-102D may be controlled by and connected to the eNB 100A.

The AN 102A may include a source identifier of the broadcast transmission to the forwarded transmission. The TD's 104 a cell radio network temporary identifier (C-RNTI) in the macro cell 101A may be used as a source ID. This may be beneficial as then the receiving eNB 100A may know which TD 104 has initiated the transmission.

In this manner the TD 104 may access the network 110 via the local ANs 102A-102D. For a communication in the opposite direction, the ANs 102A-102D may control or cause a reception of downlink (DL) data from the network node, e.g., from the eNB 100A. The eNB 100A may have transmitted this data, e.g. network service data, to the AN 102A as a response to the UL data received after block 204. Thereafter, the AN 102A may control or cause a broadcast transmission of at least part of the DL data so that the TD 104 is able to receive the broadcasted DL data in block 304 of FIG. 3. In this option, the eNB 100A may indicate a ID of the TD 104 in the transmission and the AN 102A may then include this TD ID as a target ID in the broadcast transmission. In this manner the TD 104 may know that the broadcast transmission is targeted to itself. The broadcast transmission may further include a source ID of the eNB 100A.

According to the proposed BNA mode, the data transmission is based on connectionless D2D broadcast communication between the UE 104 and the ANs 102A-102D and the TD 104 does not need to establish and maintain the connection with densely deployed small cell APs 102A-102D. The network may track and follow the TD 104 based on the data transmissions from the TD 104 to the small cell ANs 102A-102D. Therefore, the proposed BNA mode may provide a fast, simple and efficient solution in a dense local area HetNet deployment by utilizing D2D broadcast based communication between the TD 104 and the small cell ANs 102A-102D under the coordination of macro cell layer, e.g. the eNB 100A. Some example benefits of using the LA AN 102A-102D rather than direct link to the eNB 100A may include offloading of a macro cell and a higher bit rate with a lower transmission power.

FIG. 4 depicts an example of a method for enabling handover of a terminal device between a macro cell and a neighbouring macro cell with a low signalling overhead. The method may be carried out by a terminal device participating in D2D communications. In block 400, the terminal device may obtain at least one handover (HO) trigger related signalling configuration for the terminal device to trigger at least one uplink broadcast transmission when the terminal device is in a coverage area of a local area access node operating an edge of a coverage area of the macro cell network node. In other words, only when the terminal device may be in a coverage of the local area access node operating the edge of the macro cell called an edge node, the uplink broadcast transmission may be performed according to the handover triggered related configuration. Other local area access nodes may be operating differently than the edge nodes in the edge of the macro cell. This means that when the terminal device may be in a coverage of the other local area access nodes, the uplink broadcast transmission may not be performed according to the handover trigger related configuration. In FIG. 1 the terminal device is moving along the road under the coverage area of the macro cell network node from the coverage area of the edge node towards a coverage area of a target local area access node according to an arrow. Only when the terminal device is under the coverage area of the edge node of the macro cell it may trigger the broadcast transmission if the condition may be fulfilled.

In block 402, the terminal device may cause an uplink broadcast transmission from the terminal device to the network node via the local area access node according to the handover trigger related signalling configuration. In one embodiment the handover trigger related signalling configuration may comprise at least one of an uplink broadcast transmission configuration and at least one criterion to trigger the uplink broadcast transmission. In one embodiment the criterion may be an indication message from a local access node. In an embodiment the handover trigger related signalling configuration may be configured by a configuration message from a macro cell network node comprising at least one criterion to trigger the uplink broadcast transmission. In an embodiment, the at least one criterion comprises a lower limit for downlink signal strength and/or an upper limit for timing advance applied to the uplink transmissions to a macro cell network node.

In an embodiment, an uplink broadcast transmission configuration corresponding to a handover trigger related signalling configuration may comprise a time interval T to trigger the uplink broadcast transmission within a configured time period after fulfilling the predetermined criterion. In an embodiment the time interval T may be configured to be dependent on velocity of a terminal device, a cell size of a local area access node, location of the local area access node in a macro cell or density of local area access nodes. Location of the terminal device may be determined by using received signal power and/or timing advance, or by employing a satellite positioning receiver or another positioning system in the terminal device and/or the local area access node. The time interval may be configured by triggering location of the terminal device in relation to the speed of the terminal device. In such a manner the time interval T is not too long for the terminal device to move from a current macro cell network node to a range of a target macro cell network node before at least one uplink broadcast transmission is performed from the terminal device to the macro cell network node via the local area access node. In one embodiment a triggering distance to an edge of a macro cell is kept constant and the time interval T is adapted to a speed of the terminal device. In one embodiment the location and the speed of the terminal device is defined by using positioning systems and/or mapping and location intelligence applications. In one embodiment the time interval T may be defined in relation of a local area access node cell size to the speed of the terminal device. For example if the cell size is 30 m and the speed is 100 km/h the maximum value the time interval T may be 1080 ms.

In an embodiment a handover trigger related signalling configuration regarding an uplink broadcast transmission configuration may comprise a shorter uplink broadcast transmission interval, more retransmissions of a same uplink broadcast transmission may be configured in a local area access node to ensure a high reliability of the uplink broadcast transmission and high reachability to a macro cell network node. In one embodiment the uplink broadcast transmission configuration may be a service type dependent. For example, a terminal device with real-time type of services which require seamless handover may be configured with the handover trigger related configuration in the local area access node. The terminal device may identify the service type based on for example a configured Quality of Service (QoS) parameter on a radio bearer. The uplink broadcast transmission corresponding to the handover trigger related signaling configuration may be configured to the terminal device dynamically, by for example the macro cell network node, when the specific service-type related radio bearer is configured or the terminal device may use the uplink broadcast transmission corresponding to the handover trigger related signaling configuration for the radio bearer of the configured service type based on static/semi-static pre-configuration which may be made by the macro node. In one embodiment in block 400, after fulfilling the handover trigger related signalling condition by the terminal device, it may make the uplink broadcast transmission to the local area access node within configured time interval T. In one embodiment the uplink broadcast transmission may comprise normal user data. If the terminal device does not have user data in an uplink transmission buffer, the uplink broadcast transmission may contain at least one neighbouring cell measurement report or dummy data.

From the point of view of a macro cell network node, an embodiment of a method for enabling handover of a terminal device between a macro cell and a neighbouring macro cell with a low signalling overhead is presented by means of FIG. 5.

In block 500, a network node controlling a macro cell of a cellular communication system may configure at least one handover trigger related signalling configuration for at least one terminal device of the cellular communication system. This configuring may be carried out in pursuance of installing a new local area access node within the macro cell. The macro cell network node may be configured to determine locations and coverage areas of the local area access nodes located in the macro cell and, accordingly, the macro cell network node has the information of the local area access nodes located at an edge of the macro cell 101A. The macro cell network node may apply a determined location criterion in configuring, e.g. local area access nodes located at a determined geographical area defined as an edge may be configured as edge nodes. In one embodiment the handover trigger related signalling configuration may configure a terminal device to perform at least one uplink broadcast transmission in a coverage area of the edge node according to block 400 of FIG. 4. In one embodiment the handover trigger related signalling configuration may comprise an uplink broadcast transmission configuration and at least one criterion to trigger the uplink broadcast transmission. In an embodiment the criterion may be an indication message from the local access node. In another embodiment the criterion may comprise receiving, by the terminal device, a configuration message from the network node comprising the criterion to trigger the uplink broadcast transmission. In one embodiment conditions for the criterion may comprise that a threshold of a downlink reference signal strength is lower than a configured threshold and/or that a threshold of timing advance is higher than a configured threshold.

In one embodiment, a network node controlling a macro cell of a cellular communication system may configure at least one trigger for transmission of at least one indication message for at least one local area access node of the cellular communication system. In one embodiment the trigger for transmission of at least one indication message may be an explicit indication in a configuration message for the local area access node. In one embodiment, the trigger for transmission of at least one indication message may be configured as at least one indication message condition. In one embodiment the indication message condition may comprise a threshold for a downlink reference signal strength and/or a threshold for a timing advance applied to uplink transmissions to the macro cell network node.

In block 502, a macro cell network node may receive as a result of said signalling configuration an uplink message broadcasted by at least one terminal device via a. The received uplink data may first be broadcasted by a terminal device and detected and received by the local area access node in order to allow the local area access node to forward a broadcast transmission to the network node. In block 504, the network node may recognize the local area access node as an edge node located at an edge of the coverage area of the macro cell. In block 506, the network node may initiate a handover of the terminal device between the macro cell and a neighbouring macro cell. The neighbouring macro cells may have at least partly overlapping coverage areas. The coverage areas may be overlapping at least part of the time.

FIG. 6 depicts an example of a method for enabling handover of a terminal device between a macro cell and a neighbouring macro cell with a low signalling overhead. The method may be performed by a local area access node. In block 600, the local area access node may obtain a configuration for transmission of at least one indication message to a terminal device, wherein the indication message indicates that the local area access node is at an edge of a coverage area of a macro cell of a cellular communication system. In block 602, the local area access node, may cause transmission of the at least one indication message according to the configuration to the terminal device to carry out an uplink message broadcast. In one embodiment, the local access node may be configured explicitly to transmit the indication message for example when the local access node is deployed or activated/re-activated. In one embodiment obtaining the configuration for transmission of at least one indication message to the terminal device may comprise that the local area access node may be configured explicitly to transmit the indication message to the terminal device and causing, by the local area access node, transmission of the indication message to the terminal device to perform an uplink broadcast transmission. In one embodiment obtaining the configuration for transmission of at least one indication message to the terminal device may comprise that the local area access node may be configured, in the local area access node, at least one indication message condition for the local area access node to trigger transmission of at least one indication message to the terminal device and causing, by the local area access node, transmission of the indication message according to the indication message condition to the terminal device to perform an uplink broadcast transmission. The indication message condition may comprise a lower limit for downlink signal strength and/or an upper limit for timing advance applied to uplink transmissions to the macro cell network node. In one embodiment the indication message may be provided by a physical layer signal for example by some special cell reference sequences which may indicate rough location of the local area access node in the macro cell or the indication message may be provided by higher layer signalling bit(s) for example by some indication bits in system information of the local area access node.

In block 604, a local area access node may detect an uplink message broadcast from a terminal device. In block 606, the local area access node may forward the uplink message broadcast to a network node operating a macro cell. In one embodiment the uplink message broadcast may comprise an identification of the macro cell network node serving the terminal device and an identification of the terminal device of the serving network node for example Cellular Radio Network Temporary Identifier C-RNTI. In one embodiment a configuration to trigger an indication message comprise broadcasted reference signal or an information element of system information of the local area access node.

Figure 7:
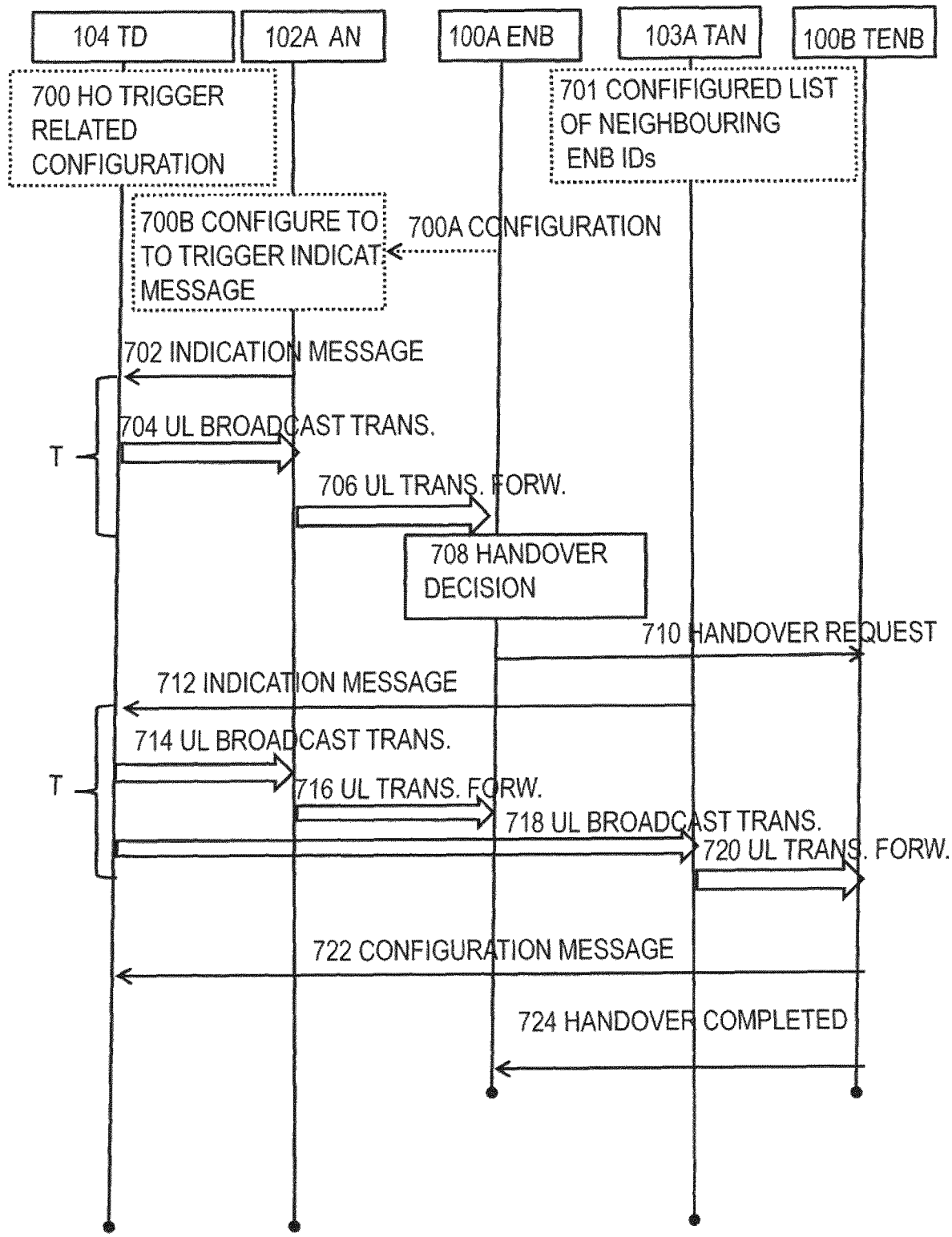
FIGS. 7, 8, 9 and 10 show signalling flow diagrams, according to some embodiments.
Figure 8:
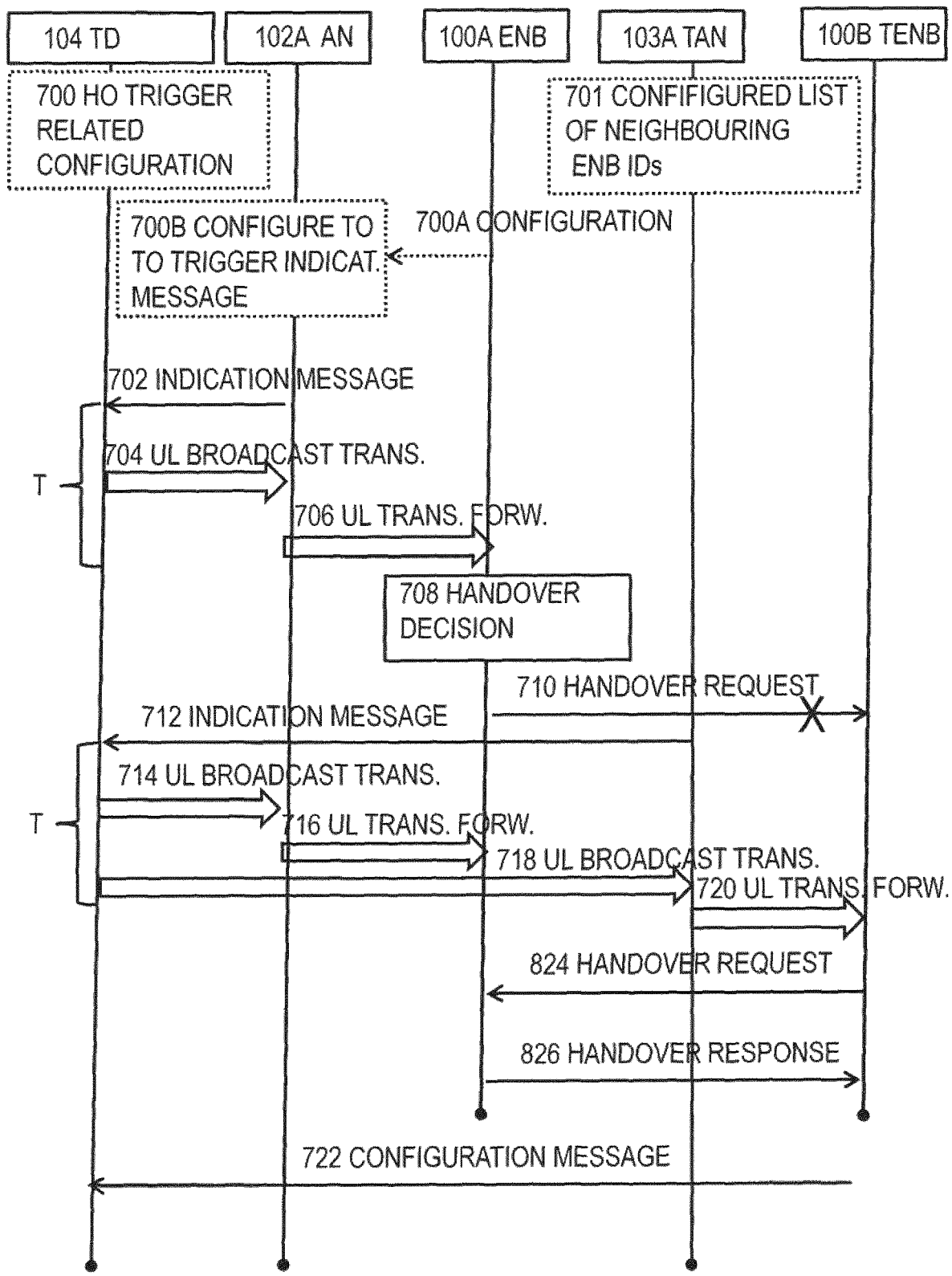
Figure 9:
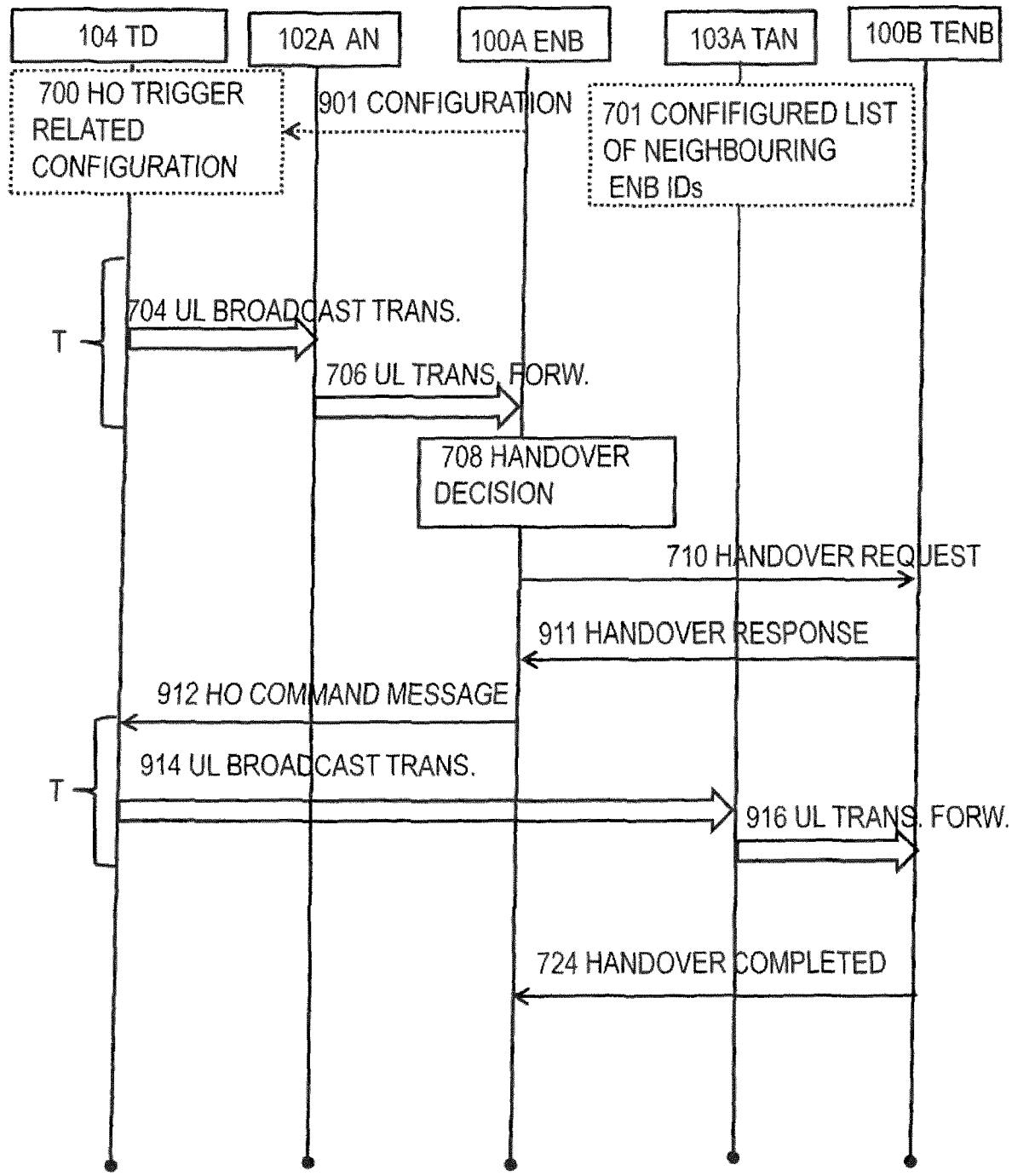
Figure 10:
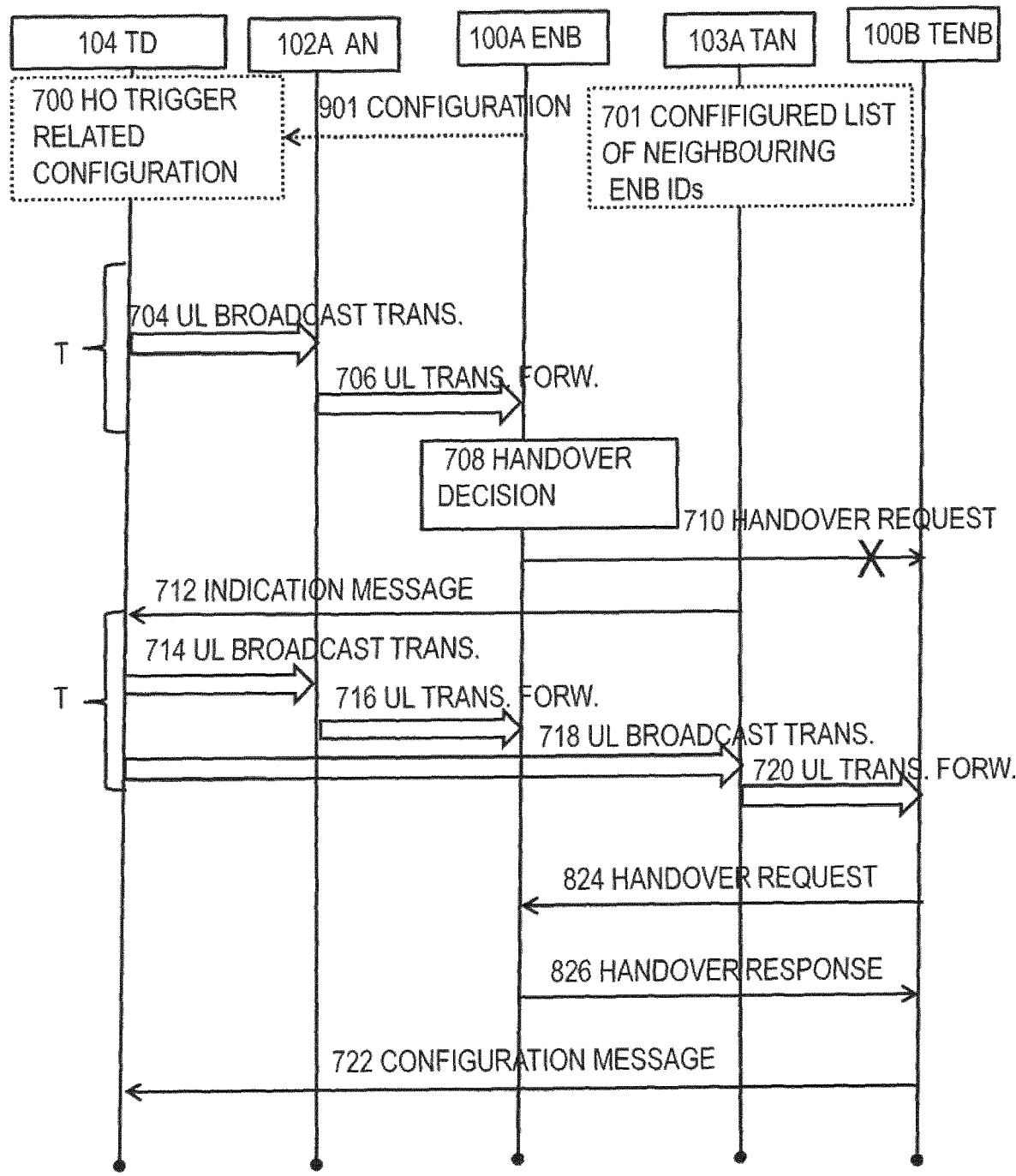

In the following, two embodiments are presented to facilitate a macro cell network node handover by utilizing the D2D BNA mode described above. In signalling flow diagrams of FIGS. 7 to 8 is presented one embodiment wherein an uplink broadcast transmission may be triggered by an indication message from a local area access node, whereas in signalling flow diagrams of FIGS. 9 to 10 is presented another embodiment wherein a terminal device may receive a configuration message from a network node comprising a handover trigger related signalling configuration to trigger an uplink broadcast transmission. The terminal device and the local area access nodes may be capable of operating in the D2D BNA mode.

Let us take a closer look at FIG. 7 in which BNA mode is used. In block 700, in a terminal device may be configured with at least one handover trigger related signalling configuration to trigger at least one uplink broadcast transmission from the terminal device to a access node when the terminal device operating an edge of a coverage area of a macro cell network node. In block 700B, the access node may receive a configuration message 700A from a network node comprising configuration to trigger at least one indication message transmission from the access node to the terminal device. In an embodiment a local area access node may be configured to trigger transmission of at least one indication message to a terminal device wherein the indication message indicates that the local area access node is at an edge of a coverage area of a macro cell of a cellular communication system and causing transmission of the indication message to the terminal device to perform an uplink broadcast transmission. In an embodiment a local area access node may be configured at least one indication message condition for the local area access node to trigger transmission of at least one indication message to a terminal device, wherein the indication message indicates that the local area access node is at an edge of a coverage area of a macro cell of a cellular communication system and upon fulfilling the condition causing, by the local area access node, transmission of the indication message to the terminal device to perform an uplink broadcast transmission. In block 702, the local area access node may send an indication message to the terminal device. In one embodiment the local area access node may be configured to transmit the indication message periodically for example by broadcasted reference signal or system information of the local area access node. When the terminal device receives the indication message it may trigger, in block 704, the uplink broadcast transmission to the local area access node. In an embodiment the uplink broadcast transmission is triggered within configured time period T after receiving the indication message. In an embodiment the broadcast transmission may comprise normal user data. If the terminal device does not have user data in an uplink transmission buffer, the uplink broadcast transmission may contain at least one neighbouring cell measurement report or dummy data. In one embodiment the broadcast transmission may comprise an identification of the network node serving the terminal device and an identification of the terminal device that the serving network node allocated for example Cellular Radio Network Temporary Identifier C-RNTI. In block 701, in the local area access nodes may be configured a list of neighbouring network nodes to/from which the terminal device may handover.

In block 706, after detecting by a local area access node an uplink broadcast transmission from a terminal device the local area access node may forward the uplink broadcast transmission from the terminal device to a network node operating a macro cell. In block 708, the network node may receive the uplink message broadcasted by the terminal device through the local area access node and determine whether or not the uplink message was received from a local area access node marked as an edge node. Upon determining that the uplink message was received through the edge node, the network node may make a handover decision based on the received uplink message. In one embodiment the received uplink message may comprise an identification of the network node serving the terminal device and an identification of the terminal device that the serving network node allocated, for example Cellular Radio Network Temporary Identifier C-RNTI. If the uplink message comprises an identification of the network node and the identification of the terminal device the network node may identify itself as a source network node. Based on history information stored in the network node, the network node may know which local area access nodes have forwarded the uplink broadcast transmissions from the terminal device. Thus the network node may be able to identify to which direction the terminal device will be moving. Identification may be based on a location of the forwarding local area access nodes in the past for example according a coordinated deployment scenario. The network node may use this information to identify a target network node and initiate a handover preparation to the target network node.

After the handover decision has been made by the network node the handover may be made in a conventional way as specified in any cellular system like LTE/LTE-A or in BNA mode. In FIGS. 7 to 10 the BNA mode is used.

In block 710, a network node may send a handover request to a target network node operating a target macro cell. In block 712, a target local area access node 103A operating under a cell edge coverage area of the target macro cell may send an indication message to a terminal device. In one embodiment a local area access node may be configured to transmit the indication message periodically for example by broadcasted reference signal or system information of the local area access node. The target local area access node may transmit the indication message as a broadcast transmission independently of a handover being performed, e.g. it may be a constant periodic transmission. Upon receiving the indication message, the terminal device may trigger an uplink broadcast transmission to the network node via the local area access node if it can receive the uplink broadcast transmission correctly according to blocks 714-716. Because the handover has not yet been occurred, the terminal device is at the same time under the coverage area of the network node and the target network node. As the result, the broadcast transmission goes also to the target network node via the target local area access node according to blocks 718-720. After receiving, by the target network node, an uplink message, broadcasted by the terminal device, the target network node may send a configuration message in block 722 to the terminal device. In an embodiment, the configuration message may be sent using a broadcast transmission mode in which the configuration message may be sent from the network node to the target local area access node and then the target local area access node 103A forwarding the configuration message using a downlink broadcast transmission mode. In an embodiment the configuration message may comprise an identification of the target network node serving the terminal device, an identification of the terminal device that the serving network node allocates and radio bearers related configurations. In an embodiment the target network node may identify itself as a target network node if the uplink message comprises an identification of the network node serving the terminal device and an identification of the terminal device of the serving network node. In block 701, in the target local area access node may be configured a list of neighbouring network nodes of the controlling target macro node to/from which the terminal device may handover. Thus the target local area access nodes may know to forward uplink broadcast transmissions to the right target network node even if the target identification is not the target network node but instead one of the listed neighbouring network node identifications of the controlling target network node. In block 724, the handover from the macro cell to the target macro cell may be completed by sending from the target network node a handover completed message to the network node.

In another embodiment as shown in FIG. 8 the process may continue according to the FIG. 7 until the block 710 where a network node may send a handover request message to a target network node operating in a target macro cell. In one embodiment the target network node may not receive the handover request message from the network node as can be seen in block 710. In another embodiment the local area access node may not receive the uplink broadcast transmission from the terminal device in block 704 and thus may not forward the uplink broadcast transmission according to block 706 to the network node. In this case the network node may not trigger the handover request to the target network node according to block 710. However the terminal device may still receive the indication message from the target local access node in block 712 and may send a broadcast transmission to the network node and to the target network node according to the blocks 714-720. After receiving by the target network node the uplink message broadcasted by the terminal device through the target local area access node the target network node may send, in block 824 a handover request message to the network node to initiate the handover procedure. In block 826 the network node may send a handover response to the target network node to provide context information of the terminal device. Upon receiving, by the target network node, the handover response from the network node the target network node may send a configuration message according to block 722 to the terminal device.

In FIG. 9, an embodiment is described in which BNA mode is used. In block 700, in a terminal device may be configured a handover trigger related signalling configuration to trigger at least one uplink broadcast transmission from the terminal device to an access node operating an edge of a coverage area of a macro cell network node. In block 901 the network node may send a configuration message to the terminal device comprising the handover trigger related signalling configuration to trigger the uplink broadcast transmission. In one embodiment the local area access node may be configured by for example an operation and a maintenance (O&M) server or the macro cell network node either to send or not to send an indication message to the terminal device. In one embodiment the handover trigger related signalling configuration may comprise at least one of an uplink broadcast transmission configuration and at least one criterion to trigger the uplink broadcast transmission. In one embodiment the criterion may comprise that a threshold of a downlink reference signal is lower than a configured threshold and/or that a threshold of timing advance is higher than a configured threshold. In one embodiment the configuration may comprise a time interval T to trigger the uplink broadcast transmission within configured time period after fulfilling the criterion. Upon fulfilling the criterion in the terminal device, it may, in blocks 704 and 706, cause an uplink broadcast transmission from the terminal device to the network node via the local area access node.

In block 708, after receiving an uplink broadcast transmission a network node may make a handover decision. In block 710, the network node may send a handover request to a target network node operating an edge of a target macro cell. In block 911, in response to the handover request the target network node may send a handover response message to the network node. In block 912, upon receiving the handover response the network node may send a handover command message to the terminal device. The handover command message may be transmitted using a downlink broadcast transmission. In one embodiment a target local area access node may be configured by for example an operation and a maintenance (O&M) or the target macro cell network node either to send or not to send an indication message to the terminal device. In response to the handover command message the terminal device may trigger an uplink broadcast transmission to the target network node via the target local area access node according to blocks 914-916. In block 724, the handover from the macro cell to the macro cell may be completed by sending from the target network node a handover completed message to the network node.

In an embodiment as shown in FIG. 10 the process may continue according to the FIG. 9 until the block 710 where a network node may send a handover request message to a target network node operating in a target macro cell. The target network node may not receive the handover request message from the network node as can be seen in block 710. In an embodiment the local area access node may not receive the uplink broadcast transmission from the terminal device in block 704 and thus may not forward the uplink broadcast transmission according to block 706 to the network node. In this case the network node may not trigger the handover request to the target network node. In block 712 he target local area access node may send an indication message to the terminal device to send at least one broadcast transmission. The terminal device may receive an indication message from the target local access node and may send a broadcast transmission to the network node and to the target network node according to the blocks 714-720. After receiving, by the target network node, the uplink message broadcasted by the terminal device via the target local area access node the target network node may send a handover request to the network node. In block 826 the network node may send a handover response to the target network node to provide context information of terminal device. Upon receiving, by the target network node, the handover response from the network node the target network node may send a configuration message according to block 722 to the terminal device.

The embodiments of FIGS. 1 to 10 as discussed above may utilize BNA mode transmissions from the terminal device to the local area access nodes to facilitate macro cell network node handover when the terminal device moves from one macro cell to another macro cell. By using BNA mode transmissions, the handover may be managed in a more efficient way with less signalling overhead.

Figure 11:
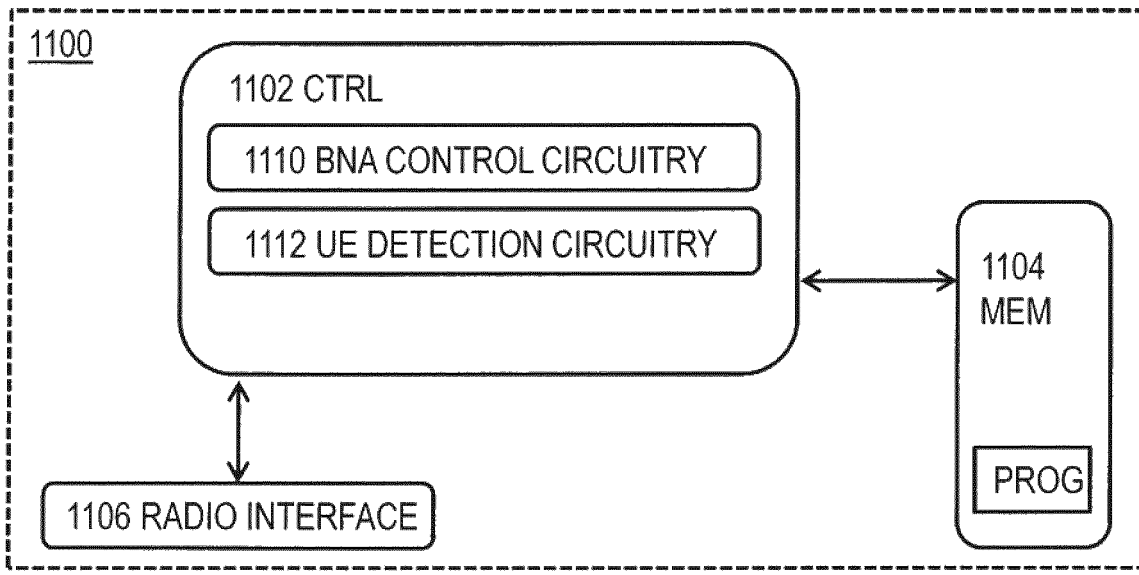
FIGS. 11 to 13 illustrate apparatuses, according to some embodiments.
Figure 12:
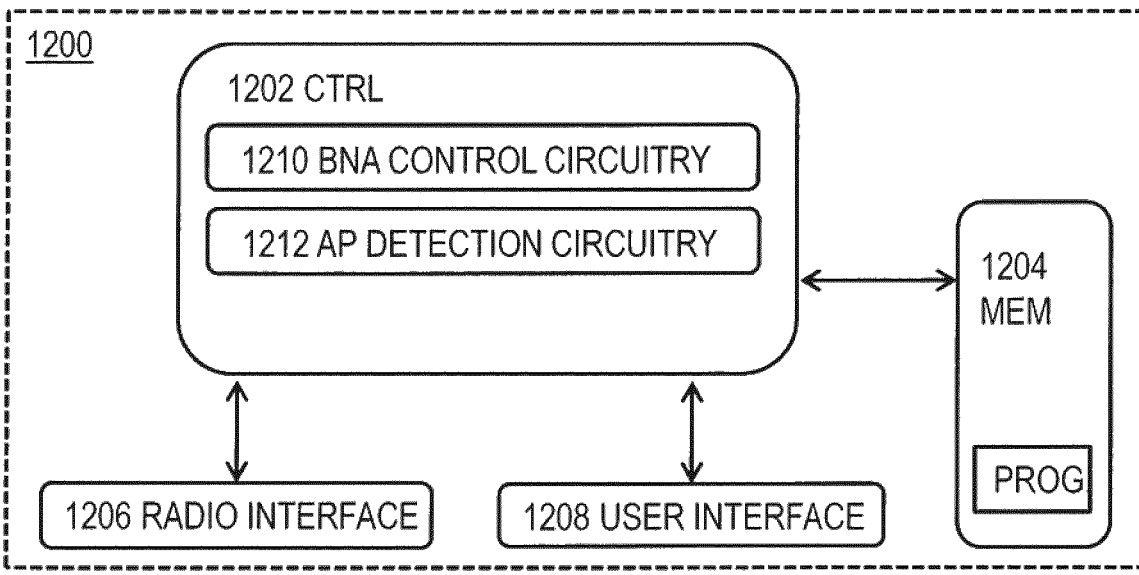
Figure 13:
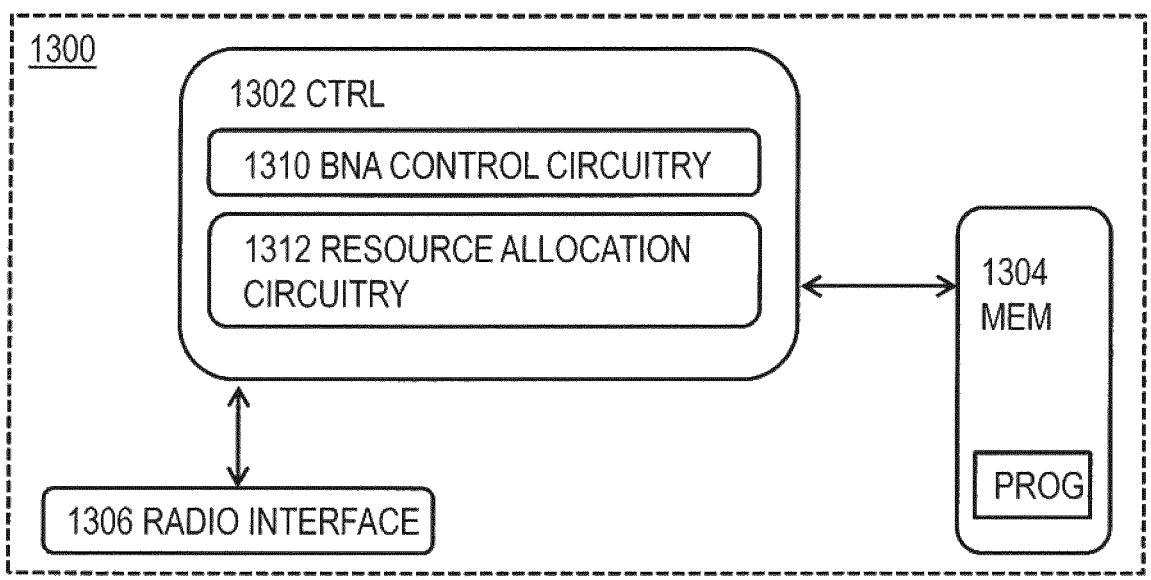

FIGS. 11 to 13 provide apparatuses 1100, 1200, and 1300 com-prising a control circuitry (CTRL) 1102, 1202, 1302, such as at least one processor, and at least one memory 1104, 1204, 1304 including a computer program code (PROG), wherein the at least one memory and the computer program code (PROG), are configured, with the at least one processor, to cause the respective apparatus 1100, 1200, 1300 to carry out any one of the embodiments of FIGS. 1 to 10, or operations thereof.

In an embodiment, these operations may comprise tasks, such as, configuring, by a network node controlling a macro cell of a cellular communication system, at least one handover trigger related signalling configuration for at least one terminal device of the cellular communication system; receiving, by the network node controlling the macro cell, as a result of said signalling configuration, an uplink message broadcasted by the at least one terminal device via a local area access node; recognizing the local area access node as an edge node located at an edge of a coverage area of the macro cell; and initiating a handover of the terminal device between the macro cell and a neighbouring macro cell.

In an embodiment, these operations may comprise tasks, such as, obtaining, by a terminal device, at least one handover trigger related signalling configuration for the terminal device to trigger at least one uplink broadcast transmission when the terminal device is in a coverage area of a local area access node operating an edge of a coverage area of the macro cell network node; and causing an uplink broadcast transmission from the terminal device to the network node via the local area access node according to the handover trigger related signalling configuration.

In an embodiment, these operations may comprise tasks, such as, obtaining a configuration, by a local area access node, for transmission of at least one indication message to a terminal device, wherein the indication message indicates that the local area access node is at an edge of a coverage area of a macro cell of a cellular communication system, and causing, by the local area access node, transmission of the at least one indication message according to the configuration to the terminal device to carry out an uplink message broadcast detecting the uplink message broadcast from the terminal device; and forwarding the uplink message broadcast to a network node operating the macro cell.

The memory 1104, 1204, 1304 may be implemented using any suitable data storage technology, such as semiconductor based memory devices, flash memory, magnetic memory devices and systems, optical memory devices and systems, fixed memory and removable memory.

The apparatuses 1100, 1200, 1300 may further comprise communication interfaces (TRX) comprising hardware and/or software for realizing communication connectivity according to one or more communication protocols. The TRX may provide the apparatus with communication capabilities to access the radio access network, for example.

The apparatus 1200 may also comprise user interface 1208 comprising, for example, at least one keypad, a microphone, a touch display, a display, a speaker, etc. Each user interface may be used to control the respective apparatus by the user.

In an embodiment, the apparatus 1100 may be or be comprised in a local area access node/point, also called a small cell base station. In an embodiment, the apparatus 1100 is or is comprised in the AN, for example.

The control circuitry 1102 may comprise a BNA control circuitry 1110 for controlling the application of the BNA mode, transmitting advertisement messages, and for communication with the eNB regarding the usage of the BNA, for example, according to any of the embodiments. A TD detection circuitry 1112 may be, e.g., for detecting the presence of nearby TDs.

In an embodiment, the apparatus 1100 is comprised in a remote control unit operatively coupled (e.g. via a wireless or wired network) to a remote radio head (RRH) located in the base station. In an embodiment, at least some of the described processes may be performed by the remote control unit. In an embodiment, the execution of the processes may be shared among the RRH and the apparatus 1100 locating in the remote control unit.

In an embodiment, the apparatus 1200 may comprise the terminal device of a cellular communication system, e.g. a user equipment (UE), a user terminal (UT), a computer (PC), a laptop, a tabloid computer, a cellular phone, a mobile phone, a communicator, a smart phone, a palm computer, or any other communication apparatus. Alternatively, the apparatus 1200 is comprised in such a terminal device. Further, the apparatus 1200 may be or comprise a module (to be attached to the apparatus) providing connectivity, such as a plug-in unit, an "USB dongle", or any other kind of unit. The unit may be installed either inside the apparatus or attached to the apparatus with a connector or even wirelessly. In an embodiment, the apparatus 1200 may be, comprise or be comprised in a terminal device, such as the TD.

The control circuitry 1202 may comprise a BNA control circuitry 1210 for controlling the application of the BNA mode, for initiating the usage of the BNA mode, and for communication with the eNB regarding the usage of the BNA, for example, according to any of the embodiments. An AN detection circuitry 1212 may be, e.g., for detecting the presence of nearby ANs.

In an embodiment, the apparatus 1300 may be or be comprised in a base station (also called a base transceiver station, a Node B, a radio network controller, or an evolved Node B, for example). In an embodiment, the apparatus 1300 is or is comprised in the macro cell network node or eNB.

The control circuitry 1302 may comprise a BNA control circuitry 1310 for controlling the application of a BNA mode, for initiating the usage of the BNA mode, controlling a handover procedure and for communication with a TD and with ANs regarding the usage of the BNA, for example, according to any of the embodiments. A resource allocation circuitry 1312 may be, e.g., for allocating resources for the BNA.

In an embodiment, an apparatus 1300 is comprised in a remote control unit operatively coupled (e.g. via a wireless or wired network) to a remote radio head (RRH) located in a base station. In an embodiment, at least some of the described processes may be performed by the remote control unit. In an embodiment, the execution of the processes may be shared among the RRH and the apparatus 1300 locating in the remote control unit.

In an embodiment, apparatuses 1100-1300 are operating according to the long term evolution or according to the long term evolution advanced.

In an embodiment at least some of the functionalities of apparatuses 1100, 1300 may be shared between two physically separate devices forming one operational entity. Therefore, each of the apparatuses 1100, 1300 may be seen to depict an operational entity comprising one or more physically separate devices for executing at least some of the described processes. The apparatus 1100, 1300 utilizing such shared architecture, may comprise a remote control unit (RCU), such as a host computer or a server computer, operatively coupled (e.g. via a wireless or wired network) to a remote radio head (RRH) located in the base station 100A, 100B or in the AN 102A-102D, 103A-103D. In an embodiment, at least some of the described processes may be performed by the RCU. In an embodiment, the execution of at least some of the described processes may be shared among the RRH and the RCU.

In an embodiment, a RCU may generate a virtual network through which the RCU communicates with a RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into a server computer or a host computer (i.e. to the RCU). External network virtualization is targeted to optimized network sharing. Another category is internal virtual networking which provides network-like functionality to software containers on a single system. Virtual networking may also be used for testing a terminal device.

In an embodiment, a virtual network may provide flexible distribution of operations between a RRH and a RCU. In practice, any digital signal processing task may be performed in either the RRH or the RCU and a boundary where the responsibility is shifted between the RRH and the RCU may be selected according to implementation.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies)

that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 10 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 10 or operations thereof. In an embodiment, these operations may comprise tasks, such as, configuring, by a network node controlling a macro cell of a cellular communication system, at least one handover trigger related signalling configuration for at least one terminal device of the cellular communication system; receiving, by the network node controlling the macro cell, as a result of said signalling configuration, an uplink message broadcasted by the at least one terminal device via a local area access node; recognizing the local area access node as an edge node located at an edge of a coverage area of the macro cell; and initiating a handover of the terminal device between the macro cell and a neighbouring macro cell. In an embodiment, these operations may comprise tasks, such as, obtaining, by a terminal device, at least one handover trigger related signalling configuration for the terminal device to trigger at least one uplink broadcast transmission when the terminal device is in a coverage area of a local area access node operating an edge of a coverage area of the macro cell network node; and causing an uplink broadcast transmission from the terminal device to the network node via the local area access node according to the handover trigger related signalling configuration. In an embodiment, these operations may comprise tasks, such as, obtaining a configuration, by a local area access node, for transmission of at least one indication message to a terminal device, wherein the indication message indicates that the local area access node is at an edge of a coverage area of a macro cell of a cellular communication system, and causing, by the local area access node, transmission of the at least one indication message according to the configuration to the terminal device to carry out an uplink message broadcast; detecting the uplink message broadcast from the terminal device; and forwarding the uplink message broadcast to a network node operating the macro cell.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 10, or operations thereof. In an embodiment, these operations may comprise tasks, such as, configuring, by a network node controlling a macro cell of a cellular communication system, at least one handover trigger related signalling configuration for at least one terminal device of the cellular communication system; receiving, by the network node controlling the macro cell, as a result of said signalling configuration, an uplink message broadcasted by the at least one terminal device via a local area access node; recognizing the local area access node as an edge node located at an edge of a coverage area of the macro cell; and initiating a handover of the terminal device between the macro cell and a neighbouring macro cell. In an embodiment, these operations may comprise tasks, such as, obtaining, by a terminal device, at least one handover trigger related signalling configuration for the terminal device to trigger at least one uplink broadcast transmission when the terminal device is in a coverage area of a local area access node operating an edge of a coverage area of the macro cell network node; and causing an uplink broadcast transmission from the terminal device to the network node via the local area access node according to the handover trigger related signalling configuration. In an embodiment, these operations may comprise tasks, such as, obtaining a configuration, by a local area access node, for transmission of at least one indication message to a terminal device, wherein the indication message indicates that the local area access node is at an edge of a coverage area of a macro cell of a cellular communication system, and causing, by the local area access node, transmission of the at least one indication message according to the configuration to the terminal device to carry out an uplink message broadcast; detecting the uplink message broadcast from the terminal device; and forwarding the uplink message broadcast to a network node operating the macro cell. The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes or code portions may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 10 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
   obtaining, by a terminal device, at least one handover trigger related signaling configuration for the terminal device to trigger at least one uplink broadcast transmission when the terminal device is in a coverage area of a local area access node operating on an edge of a coverage area of a macro cell network node; and
   causing an uplink broadcast transmission from the terminal device to the local area access node, the local area access node included in a plurality of local area access nodes that receive the uplink broadcast transmission, according to the handover trigger related signaling configuration for forwarding at least part of uplink data to the macro cell network node.

2. The method of claim 1, wherein the handover trigger related signaling configuration comprises at least one of:
   at least one uplink broadcast transmission configuration and at least one criterion to trigger the uplink broadcast transmission.

3. The method of claim 2, wherein the at least one criterion comprises one of:
   receiving, by the terminal device, an indication message from the local access node to trigger the uplink broadcast transmission; and
   a downlink reference signal being lower than a configured threshold and/or timing advance being higher than a configured threshold.

4. The method of claim 1, wherein the uplink broadcast transmission from the terminal device to the local area access node comprises at least one of:
user data, at least one neighboring cell measurement report and dummy data.

5. The method of claim 1, further comprising:
   receiving, by the terminal device, a handover command message transmitted by a downlink transmission from the macro cell network node or a target macro cell network node in a handover of the terminal device to the target macro cell network node causing an uplink broadcast transmission from the terminal device to the local area access node; or
   receiving, by the terminal device, in response to the uplink broadcast transmission from the terminal device to the local area access node, a configuration message transmitted by a downlink transmission from the target macro cell network node in a handover of the terminal device to the target macro cell network node.

6. The method of claim 1, further comprising:
   receiving, by the terminal device, a handover command message transmitted by a downlink transmission from the macro cell network node or a target macro cell network node in a handover of the terminal device to the target macro cell network node causing an uplink broadcast transmission from the terminal device to the local area access node; or receiving, by the terminal device, in response to the uplink broadcast transmission from the terminal device to the local area access node, a configuration message transmitted by a downlink transmission from the target macro cell network node in a handover of the terminal device to the target macro cell network node, wherein the uplink broadcast transmission from the terminal device to the local area access node comprises at least one of:
   an identification of a network node serving the terminal device and an identification of the terminal device that the serving network node allocates.

7. The method of claim 1, wherein the uplink broadcast transmission is triggered within a configured time period after applying the handover trigger related signaling configuration.

8. An apparatus, comprising:
   at least one processor and at least one memory including a computer program code, wherein the at least one memory and the computer program code are configured, with the at least one processor, to cause a network node controlling a macro cell of a cellular communication system to:
   configure at least one handover trigger related signaling configuration for at least one terminal device of the cellular communication system;
   receive as a result of said signaling configuration, an uplink message forwarded by a local area access node, the local area access node included in a plurality of local area access nodes that receive the uplink broadcast transmission and receiving the uplink message broadcasted from the at least one terminal device;
   recognize the local area access node as an edge node located on an edge of a coverage area of the macro cell; and
   initiate a handover of the terminal device between the macro cell and a neighboring macro cell.

9. The apparatus of claim 8, further comprising causing the network node to:
   configure at least one trigger for transmission of at least one indication message for at least one local area access node of the cellular communication system.

10. The apparatus of claim 8, further comprising causing the network node to:

configure, by the handover trigger related signaling configuration, a terminal device to carry out the uplink broadcast transmission according to the configuration in a coverage area of the local area access node according to at least one criterion.

11. The apparatus of claim 8, further comprising causing the network node to:
in pursuance of a handover of another terminal device from another macro cell to the macro cell of the network node:
receive a handover request message from another network node operating in the other macro cell;
receive an uplink message forwarded by the local area access node, the local access node receiving the uplink message broadcasted from the another terminal device;
send a configuration message based on the uplink message to the another terminal device; and
complete the handover after the another terminal device has been configured.

12. The apparatus of claim 8, further comprising causing the network node to:
in pursuance of a handover of another terminal device from another macro cell to the macro cell of the network node:
receive an uplink message forwarded by the local area access node, the local access node receiving the uplink message broadcasted from the another terminal device;
in response to the uplink message, cause transmission of a handover request message to another network node operating the another macro cell;
in response to a handover response message sent by the another network node, send a configuration message to the another terminal device; and
complete the handover after the other terminal device has been configured.

13. An apparatus, comprising:
at least one processor and at least one memory including a computer program code, wherein the at least one memory and the computer program code are configured, with the at least one processor, to cause a terminal device to:
obtain at least one handover trigger related signaling configuration for the terminal device to trigger at least one uplink broadcast transmission when the terminal device is in a coverage area of a local area access node operating on an edge of a coverage area of a macro cell network node; and
cause an uplink broadcast transmission from the terminal device to the local area access node, the local area access node included in a plurality of local area access nodes that receive the uplink broadcast transmission, according to the handover trigger related signaling configuration for forwarding at least part of uplink data to the macro cell network node.

14. The apparatus of claim 13, wherein the handover trigger related signaling configuration comprises at least one of:
the uplink broadcast transmission configuration and at least one criterion to trigger the uplink broadcast transmission.

15. The apparatus of claim 13, wherein the at least one criterion comprises one of:

receive, by the terminal device, an indication message from the local access node to trigger the uplink broadcast transmission; and
a downlink reference signal being lower than a configured threshold and/or timing advance being higher than a configured threshold.

16. The apparatus of claim 13, wherein the uplink broadcast transmission from the terminal device to the network node via the local area access node comprises at least one of:
user data, at least one neighboring cell measurement report and dummy data.

17. The apparatus of claim 13, further comprising causing the terminal device to:
receive a handover command message transmitted by a downlink transmission from the macro cell network node or a target macro cell network node in a handover of the terminal device to the target macro cell network node causing an uplink broadcast transmission from the terminal device to the local area access node, the local area access node receiving the uplink broadcast transmission from the terminal device; or receive in response to the uplink broadcast transmission from the terminal device to the local area access node a configuration message transmitted by a downlink transmission from the target macro cell network node in a handover of the terminal device to the target macro cell network node.

18. The apparatus of claim 13, further comprising causing the terminal device to:
receive a handover command message transmitted by a downlink transmission from the macro cell network node or a target macro cell network node in a handover of the terminal device to the target macro cell network node causing an uplink broadcast transmission from the terminal device to the local area access node, the local area access node receiving the uplink broadcast transmission from the terminal device; or receive in response to the uplink broadcast transmission from the terminal device to the local area access node a configuration message transmitted by a downlink transmission from the target macro cell network node in a handover of the terminal device to the target macro cell network node, wherein the uplink broadcast transmission from the terminal device to the target macro cell network node through the local area access node comprises an identification of a network node serving the terminal device and/or an identification of a terminal device served by the network node.

19. The apparatus of claim 18, wherein the configuration message comprises at least one of:
an identification of the target macro cell network node as the network node serving the terminal device, an identification of a terminal device served by the target macro cell network node, and a radio bearer-related configuration.

20. The apparatus of claims 13, wherein the uplink broadcast transmission is triggered within a configured time period after applying the handover trigger related signaling configuration.

* * * * *